United States Patent [19]
Lee et al.

[11] 3,989,146
[45] Nov. 2, 1976

[54] FEED AND ALIGNMENT SYSTEM FOR PANELS

[75] Inventors: Wilson J. Lee, North Bend; Clotis A. Wilson, Sr., Coos Bay; Vincent E. Howell; E. James Bunno, both of North Bend, all of Oreg.

[73] Assignee: Weyerhaeuser Company, Tacoma, Wash.

[22] Filed: Feb. 10, 1975

[21] Appl. No.: 548,490

[52] U.S. Cl. .............................. 214/8.5 SS; 221/241
[51] Int. Cl.² ......................................... B65G 59/00
[58] Field of Search .......... 214/8.5 SS, 8.5 F, 8.5 R; 198/35, 283; 221/241, 272

[56] References Cited
UNITED STATES PATENTS

| | | | |
|---|---|---|---|
| 1,838,780 | 12/1931 | Miller | 214/8.5 F |
| 3,811,553 | 5/1974 | Riggs | 198/283 |
| 3,841,341 | 10/1974 | Englund | 133/4 R |

*Primary Examiner*—M. H. Wood, Jr.
*Assistant Examiner*—John A. Carroll

[57] ABSTRACT

A vertical stack of generally horizontal panels is contained within a bin structure and rests on several rollers. At the upstream end of the system an injector is operative to push a predetermined number of panels linearly from the bottom of the stack toward the downstream direction. Once the injector shoes push the predetermined number of panels from the bottom of the stack, a powered roller acts to move the stacked panels toward an aligning station. After the stacked panels clear the bin structure, a crowding chain operates to align the long edges of the panels such that they will be properly aligned when they enter the downstream work station.

7 Claims, 6 Drawing Figures

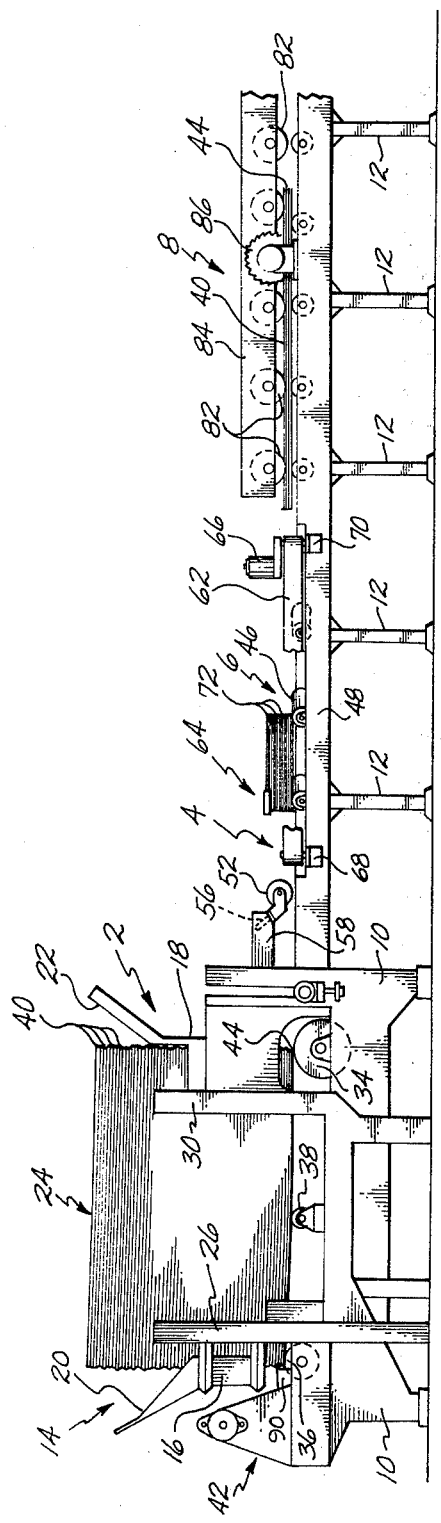
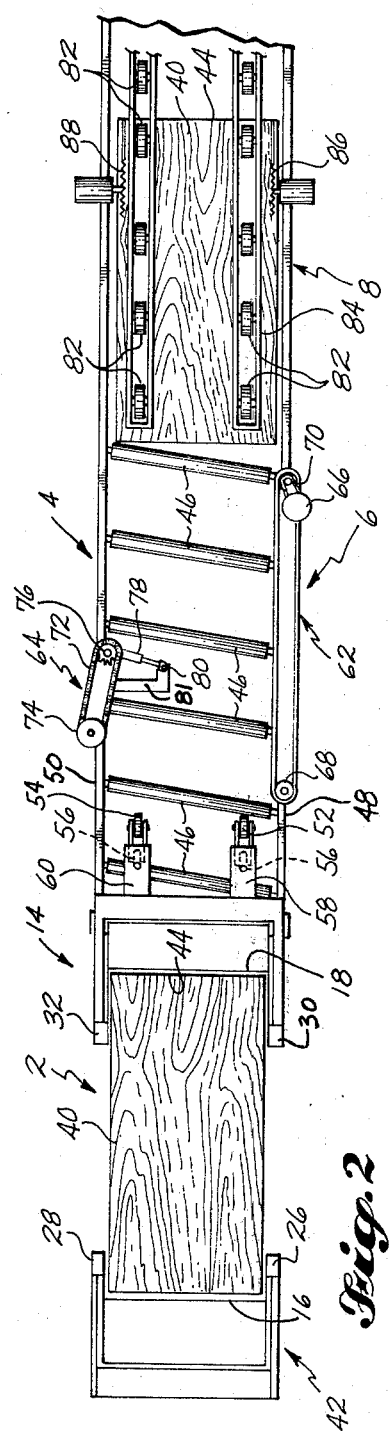
Fig.1
Fig.2

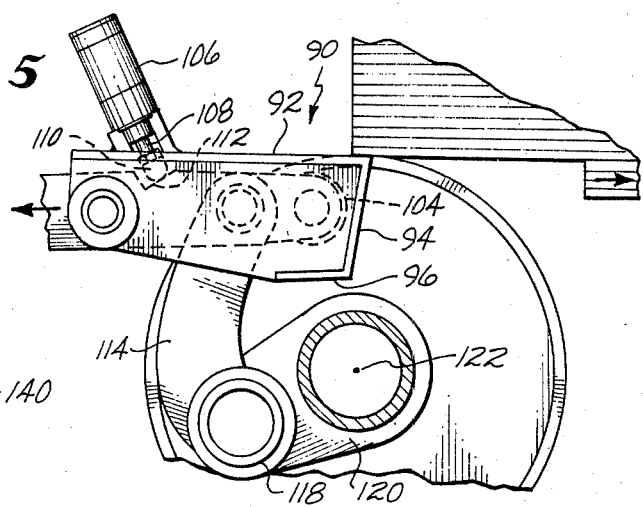
*Fig. 5*
*Fig. 3*
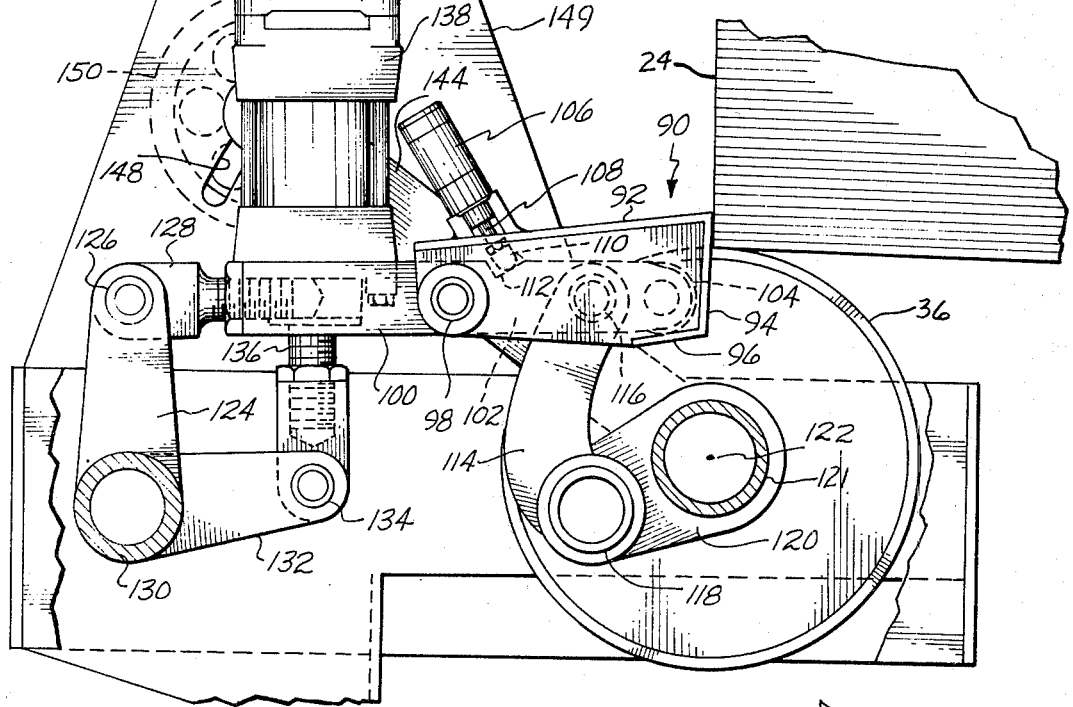
*Fig. 4*
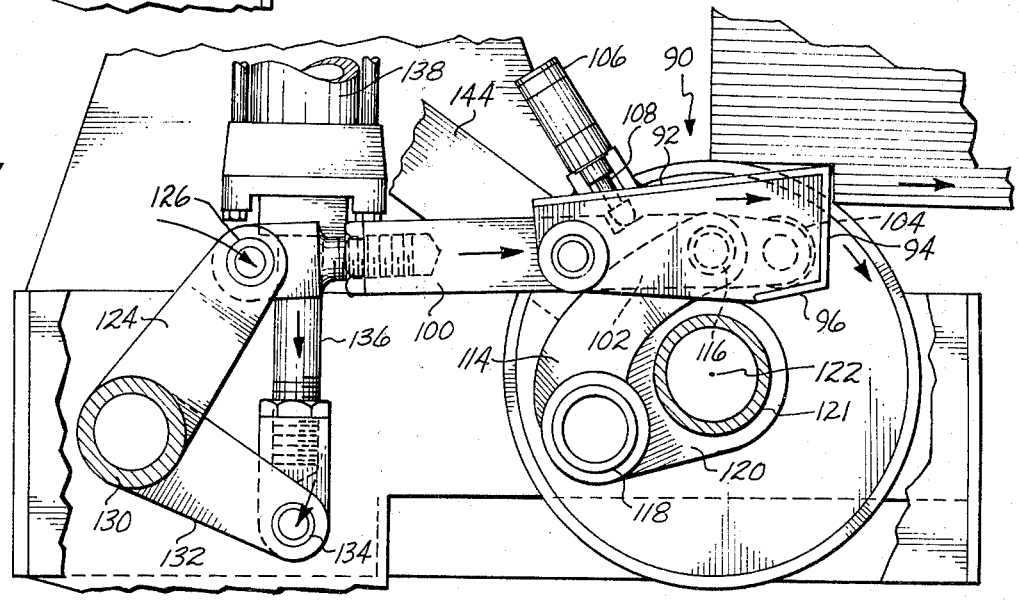

FEED AND ALIGNMENT SYSTEM FOR PANELS

BACKGROUND OF THE INVENTION

This invention relates generally to panel feeding systems and more particularly to a panel feeding and alignment system that operates to carry a predetermined number of stacked and aligned panels into a work station.

Panel products are manufactured within several different industries and these manufactured panels serve a variety of end uses. One such typical panel is the plywood panel which is comprised of a plurality of wood veneers bonded together that can be used for a variety of end uses such as roof sheathing, floor decking, concrete forms, and the like. In the typical plywood manufacturing plant single flat veneers, having been spread approximately with adhesive, are laid up into panel form and the thusly formed panels are then conveyed into a press system where the adhesive is cured.

Prior to the veneer layup process, the individual veneeers are roughly sized according to the desired dimension of the final panel. An exception may be the core veneer which can be of random width. Consequently, when the panels come from the press their overall plan dimension is roughly to size but must be trimmed to the final size.

In the plywood industry it is common practice to feed the panels after pressing through a trimming saw system in order to arrive at their final size which could be the typical 4 × 8 sheet of plywood. In the past the most commonly used system for trimming the plywood panels has been the well-known skinner saw where a feeding device would feed single panels through a skinner saw such that the two longer edges would be finally formed. One typical system employed a bin in which a plurality of generally horizontally disposed and uniformly stacked panels were placed. At least one powered roll at the bottom of the stack could be activated in proper sequence to feed a single panel off the bottom onto a conveyor which would then carry the panel through the skinner saws.

This particular system was production limited in that only a single panel was fed through the skinner saws at any one sequencing. Depending on the production capacity of the layup and press system at any given plywood facility, the total output of the plywood plant could be directly dependent upon the production capacity of the skinner saws. It thus became apparent that, if an apparatus and method could be devised for improving the production through the trimming system, overall production from the plywood plant could be increased.

Ideally it would be advantageous to modify generally existing apparatus in order to increase production. One obvious method of increasing production through the trimming system is to optimize the feed rate of individual panels. However, this particular method has already been essentially optimized in most plywood facilities with existing equipment. Another somewhat obvious method, yet one which had not been optimized or reduced to practice, is that of feeding at least two panels through the trimming system at a particular sequencing. Of course, if two panels can be fed through the skinner saws at one sequencing and at the same optimum feed rate as in the best known single panel systems, then production is essentially doubled through the trimming system.

Accordingly from the foregoing, one object of the present invention is to increase the rate of production through a panel work station.

Another object of the present invention is to feed two or more panels together from the bottom of a vertical stack of panels toward a work station.

Yet a further object of the present invention is to provide an aligning function such that proper alignment is assured when the stack panels enter the work station.

Still a further object is to provide a feeding and aligning structure which is simple in design and efficient in operation.

Yet a further object is to design a structure for the intended purposes that can utilize selected existing machinery.

These and other objects of the invention will become apparent upon reading the following specification in conjunction with the attached drawing.

SUMMARY OF THE INVENTION

Briefly stated, the present invention is practiced in one form by supporting a vertical stack of generally horizontal panels atop a supporting structure, with one part of the structure being comprised of a powered roll. At the bottom upstream end of the vertical stack is a vertically adjustable injector mechanism that operates to sequentially motivate two or more panels toward the downstream direction with the powered roll acting to continue the downstream movement to carry the panels onto a conveyor surface. The conveyor surface carries the plurality of stacked panels into an alignment station whereby the stacked panels are arranged such that at least one corresponding side edge of the stacked panels is aligned in a plane of travel. After aligning the stacked panels, the conveyor system carries the panels into a work station which may be comprised of a plurality of saws that trim two opposed edges of the stacked panels.

BRIEF DESCRIPTION OF THE DRAWING

FIG. 1 is a side elevation view showing the overall structure for the feed and alignment system.

FIG. 2 is a top plan view also showing the overall structure.

FIG. 3 is a side elevation view showing the detailed structure of the injector mechanism.

FIG. 4 is a view similar to FIG. 3 but shows the injector shoes motivating a plurality of stacked panels in the downstream direction.

FIG. 5 is also a view similar to FIG. 3 but shows the injector shoes being retracted to the ready position.

DESCRIPTION OF THE PREFERRED EMBODIMENT

Figure 6:
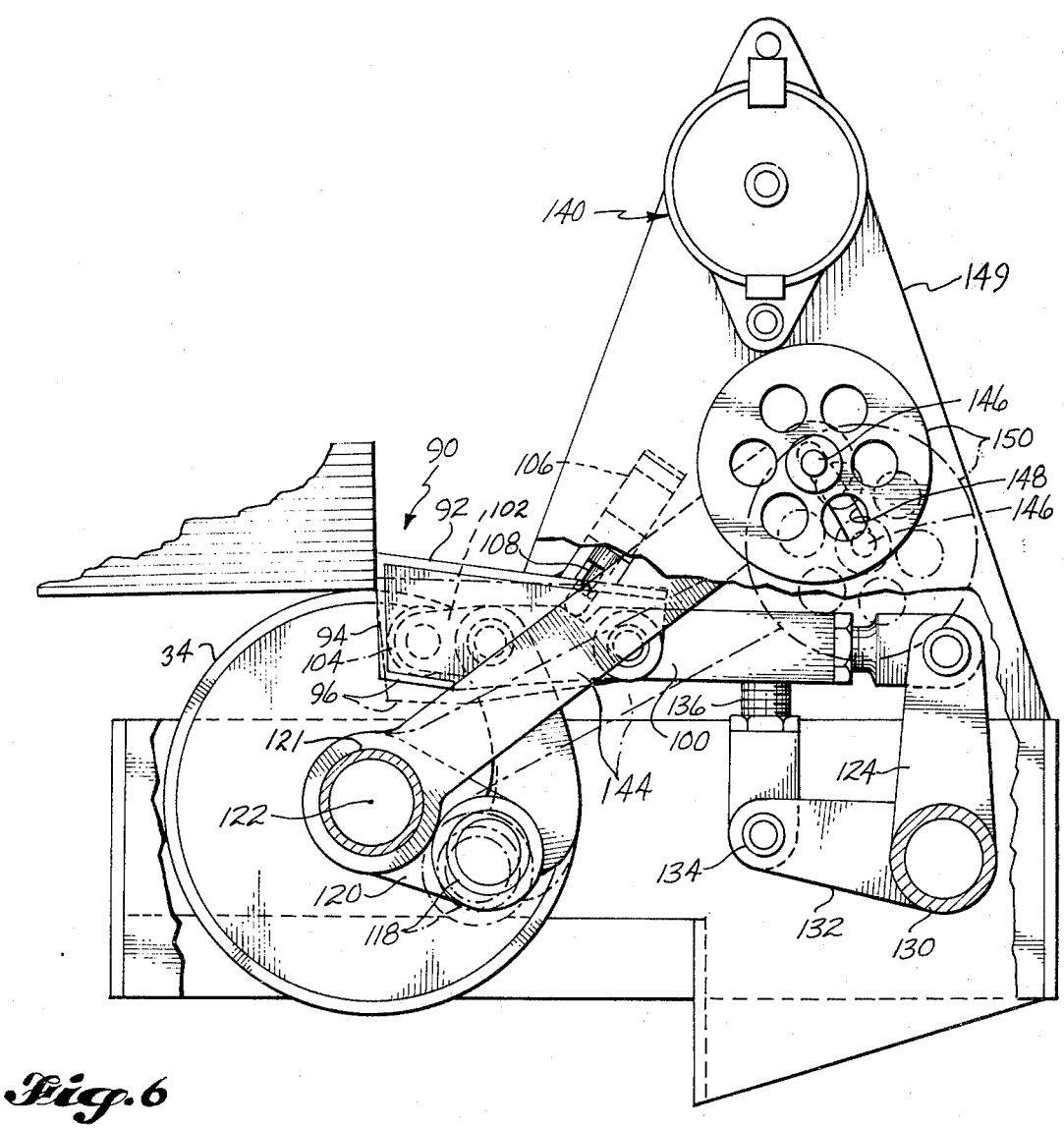
FIG. 6 is a side elevation view of the opposite side of the injector mechanism showing the adjustment mechanism for controlling the vertical height of the injector shoes.

Turning first to FIGS. 1 and 2 a general description will be given of the overall feed and alignment system. As previously mentioned, the basic function of the present invention is to feed a plurality of stacked panels from a feed station indicated generally at 2 onto a conveyor system generally indicated at 4 and through an aligning station indicated generally at 6. From aligning station 6 the conveyor system 4 carries the stacked panels into a work station generally indicated at 8. The overall feeding and aligning system is supported in a proper operational orientation through any suitable supporting means such as vertical beams generally indicated at 10 under the feed station 2 and at 12 under the aligning station 6 and work station 8. With respect to a convention for flow direction, the linear flow will generally begin at feed station 2 and progress in the longitudinal direction downstream toward the work station 8.

At feed station 2 is a bin structure 14 which is comprised generally of a pair of spaced vertically extending walls 16, 18 both having inclined top portions 20, 22 for guiding an incoming stack of panels which is indicated generally at 24. Also comprising a part of the bin structure 14 are laterally spaced, vertically extending arm members 26, 28 and 30, 32. The pair of arm members 26, 28 are spaced longitudinally from the corresponding pair 30, 32 a distance that is greater than the distance between a pair of fork arms on a typical forklift truck. It will be appreciated that the longitudinal distance between vertical walls 16, 18 and the lateral distance between the arm members 26, 28 and 30, 32 will correspond generally to the dimensions of the panels to be positioned within bin structure 14.

As a new stack of panels 24 is to be positioned within the bin structure 14, it is to be noted that each individual panel is in need of trimming. When a forklift truck or the material handling device lowers the stack 24 into bin structure 14, it will position stack 24 on the top of a suitable support means which is comprised of a front laterally extending powered roll 34 and a rear laterally extending idler roll 36. Idler roll 36 extends laterally a distance that is somewhat less than the width dimension of the panels as will become apparent later. The distance between the respective axes of the longitudinally spaced rolls 34, 36 is slightly less than the length of the smallest panel that is to be encountered. Ideally, the trailing edge of any individual panel to be encountered should become positioned approximately over the axis of idler roll 36. Providing an additional support point for the stack of panels 24 is a center idler roll 38.

Thus, there are three laterally extending support points for the stack of panels 24. As will become apparent, it would be desirable to have the surface of powered roll 34 comprised of a material having a high coefficient of friction such as polyurethane. It will also be appreciated that the uppermost point of the surface of each roll 34, 36, 38 will form a substantially horizontal plane such that the bottommost panel, each panel in stack 24 being indicated as 40, will be in a horizontal plane.

The structure just described is one that is generally known in the plywood industry with one exception being that the powered roll is positioned slightly upstream from the position depicted in FIG. 1. The structure described would be operable to remove a single panel 40 from the bottom of stack 24 by the action of powered roll 34 clutching the bottom surface of a single panel and motivating it longitudinally in the downstream direction. Such a structure is, however, incapable of removing more than a single panel at a single sequencing of the powered roll.

The structure that can be added in order to cause more than a single panel to be motivated longitudinally in the downstream direction is the injector or feed mechanism generally indicated at 42. Suffice it to say at present that the function of injector mechanism 42 is to motivate a predetermined number of stacked panels longitudinally in the downstream direction. Assuming that the injector mechanism 42 has been actuated and causes a plurality of panels to move longitudinally forward from the bottom of stack 24, it is apparent that the static friction between the top surface of the upper panel in the moving stack and the bottom surface of the bottom panel in the remaining stack has been overcome. Once the plurality of panels begin to move downstream as caused by the injector 42 and continued by the powered roll 34 that static friction between the plurality of panels is sufficient to hold them together while the sliding friction between the top panel in the moving stack and the bottom panel in the remaining stack is low enough to allow the plurality of panels to move as a group. Once the leading edge 44 of that plurality of panels to be fed into work station 8 passes beyond powered roll 34 it must be supported in its travel through aligning station 6.

Conveyor system 4 is comprised of a plurality of laterally extending, longitudinally spaced rollers 46. Some of rollers 46 may be powered in order to maintain the longitudinal downstream movement of the plurality of traveling panels. The rollers 46 are supported in a horizontal plane by a pair of spaced support rails 48, 50. The longitudinal distance between the first and last roller in the conveyor system 4 will be greater than the longer dimension of any single panel 40 thus allowing the aligning mechanism at aligning station 6 to function properly. A pair of top holddown rolls 52, 54 are positioned downstream from powered roll 34 but upstream from aligning station 6 and operate to exert a downward biasing force on the traveling plurality of panels. Holddown rolls 52, 54 are adapted to pivot about point 56 on their respective supporting arms 58, 60 through appropriate spring means or the like (not shown). Thus holddown rolls 52, 54 can accommodate a dimension that can vary depending upon the number of panels being conveyed while maintaining a substantially equal pressure over the thickness range. The last roller 46 is positioned adjacent the infeed end of the work station 8.

The aligning station 6 is comprised of a vertically extending, longitudinally traveling endless straight edge 62 together with a vertically extending, longitudinally traveling pivotal crowding edge 64. The traveling straight edge 62 extends a vertical distance sufficient to allow contact of all edges of the traveling panels. The longitudinal dimension of traveling straight edge 62 should be approximately equal to the longer dimension of an individual panel. Straight edge 62 can be powered by any suitable means such as an electric motor 66. It will be recognized by those skilled in the art that traveling straight edge 62 can be comprised of a flexible belt material trained about a pair of longitudinally spaced vertical rollers 68, 70 which in turn are supported by suitable means.

The pivotal crowding edge 64 is spaced laterally from traveling straight edge 62 and is comprised of vertically spaced individual endless chains 72 each of which is trained about a pair of longitudinally spaced rotatable sprocket rolls 74, 76. The upstream sprocket member 74 acts as an axis about which the entire edge 64 can rotate in a vertical plane. Attached to the frame that supports sprocket 76 and chains 72 is an actuator cylinder 78 that is operable to cause the edge 64 to rotate about the axis of sprocket 74. The actuating cylinder 78 is fixed at its other end to a suitable pinned connection 80 which in turn is supported by suitable means 81.

As a plurality of stacked and moving panels enters the aligning station 6 the plurality of panel edges adjacent to the pivotal edge 64 will have exerted on them a lateral force that will tend to move the traveling panels laterally against the opposite traveling straight edge 62 thus tending to align the panel edges that are moving against traveling straight edge 62. Also acting to cause the bottom panel in the moving plurality of panels towards the traveling straight edge 62 are the rollers 46 which are slightly skewed toward straight edge 62 thereby tending to convey the panel atop rollers 46 toward straight edge 62.

The plurality of individual panels 40, now having one longer edge aligned with one another, is conveyed into work station 8. In FIGS. 1 and 2 of the drawing, the work station is a trimming saw system or what is sometimes known in the plywood industry as a skinner saw. In order to hold the plurality of stacked panels in proper alignment as they travel through work station 8 a plurality of laterally and longitudinally spaced hold down rolls 82 are provided and are mounted in a suitable support means 84. In work station 8 a pair of laterally spaced edge trimming saws 86, 88 are provided. Edge trimming saws 86, 88 are spaced a predetermined distance depending on the finally desired width of each individual panel 40. After the plurality of stacked panels passes through work station 8 they may be restacked into a larger stack and then passed through another work station to put the remaining two edges on each panel in order to finalize the desired dimension.

Turning now to FIGS. 3 – 6, a detailed description will be given of the injector or feed mechanism 42. Positioned across the lateral dimension of the feed station 2 are the injector shoes, each being indicated at 90 in the Figures. Each injector shoe 90 is comprised of at least a top wall 92, a front pusher wall 94, a bottom bearing wall 96, and a pinned attaching means 98. The individual injector shoes 90 are attached through attaching means 98 to a longitudinally extending pusher arm 100. As will be recognized, when referring to FIG. 3, and viewing the injector shoe position with respect to the uppermost point of idler roll 36 and stack of panels 24 that it is the front pusher wall 94 that will actually exert the longitudinal force to a plurality of individual panels 40. The top wall 92, being in a substantially horizontal plane will slide along the bottom surface of the bottom most panel in the remaining stack as best seen in FIG. 4. It will be recognized that the applied force causing the injector shoes 90 to move forward will be exerted through the pinned attaching means 98 as caused by pusher arms 100. In the retracted position, the front pusher wall 94 will be slightly upstream from the rear edge of the stack of panels 24 and the exposed portion of pusher wall 94, that is, the vertical dimension from the top of rear idler roll 36 to the uppermost point on the injector shoe 90 will be a preselected dimension corresponding to the thickness of the desired number of panels to be transported. As will be described later, an adjusting mechanism is provided so the exposed height of injector shoes 90 may be controlled, thereby allowing an operator to preselect the number of panels to be removed from the bottom of the stack at any one sequencing.

A structure is provided which allows each individual injector shoe 90 to rotate about the pinned attaching means 98 when it is in its forward positions and takes the weight of the panel stack 24. The pusher arms 100 have an extension arm 102 extending longitudinally and substantially in a horizontal plane from the pinned attaching means 98. The longitudinal dimension of each extension arm 102 is sized so its outermost end will be approximately adjacent the interior surface of front pusher wall 94. As will be recognized, the injector shoe structure can rotate about the pinned attaching means 98 through an angle that is determined by the distance between the top surface of bottom bearing wall 96 and the bottom surface of top wall 92. Attached to the end of extension arm 102 is a rotating round bearing 104 that serves as the contact point between the extension arm 102 and one of the interior surfaces of the injector shoes 90.

Fixed to the top wall 92 toward the upstream end is an inclined movement absorbing air cylinder 106. The end of ram 108 on cylinder 106 is provided with bearing surface 110. The bearing surface 110 is adapted to continually ride against a bearing surface 112 that is positioned within the top surface of extension arm 102. Cylinder 106 is one that exerts a constant pressure on the bearing surface 112. When the injector shoes 90 are in their retracted position, the pressure will cause the injector shoes to rotate to their up position where the rotatable bearing 104 will bear against the top surface of bearing wall 96. When the injector shoes 90 are in their forward position having caused a plurality of panels to move toward the downstream direction, it will be seen in FIG. 4 that the weight of the remaining stack will force the injector shoes to rotate downwardly. The cylinder 106 is operable to rotate the injector shoes 90 back to their upper retracted position after each returning shoe clears the upstream edge of the remaining stack as best seen by referring to FIG. 5.

Supporting extension arms 102 are rotatable support members 114 that are pinned to the extension arms at pinned connection points 116. At the opposite end of each support arm 114 it is rotatably mounted on a movable bearing shaft 118. Each support arm 114 will rotate forwardly about its shaft 118 as the injector shoes 90 are motivated toward the downstream direction. The shafts 118 in turn are supported by support arm members 120 that are fixed at their opposite ends to a central rotatable shaft 121 that extends across the lateral dimension of roll 36. The axis 122 of rotatable shaft 121 is the same as that of roll 36.

A plurality of laterally spaced pivoting arm members 124 having pinned connection 126 at one end are operable to cause the pusher arms 100 to move longitudinally. An extension piece 128 extends between each pinned connection 126 and the upstream ends of pusher arms 100. At the opposite ends of pivoting arms 124 they are suitably mounted so as to be rotatable on common shaft 130. Extending outwardly from the rotating shaft 130 and at an angle of approximately 90 degrees from arms 124, is lever arm 132. Lever arm 132 terminates at a pinned connection 134 to which is attached a ram 136 of vertically extending actuating cylinder 138. At the other end of cylinder 138 are suitable support means 140. A pinned connection at 142 allows cylinder 138 to pivot during operation.

Turning now to FIG. 6, the adjustment mechanism for controlling the vertical height of injector shoes 90 will be described. Fixed to shaft 121 and operable to cause each laterally spaced arm member 120 to rotate about axis 122 is a generally upwardly extending adjustment arm member 144. The opposite end of arm 144 is adapted to be moved through a small arc as indicated by the phantom outline in FIG. 6. By so moving arm 144 the vertical position of extension arm 102 can be controlled thereby controlling the vertical height of injector shoes 90. A stoplock pin 146 is mounted on the upper end of adjustment arm 144 and extends through slot 148 in vertical plate 149 which corresponds to the shape of the arc through which arm 144 can travel. A hand wheel 150 is, in turn, movable through the arc of slot 148 and is adapted to move pin 146 in response to actuation by an operator. Hand wheel 150 also has means to lock pin 146 in the desired position at a given point along slot 148. It will be appreciated that when pin 146 is in its uppermost position, within the slot, then the injector shoes 90 will be set to remove the maximum predetermined number of panels from stack 24. Conversely, when pin 146 is at its lowermost point in slot 148 then injector shoes 90 will be set to remove the minimum predetermined number of panels.

A description will now be given of an operational sequence of events whereby a plurality of stacked panels will be fed from the bottom of stack 24 through the aligning station 6 and work station 8. Assume that four panels are to be removed from the bottom of stack 24. In the structure depicted this would represent the approximate maximum number in view of the structurally designed height limitation in injector shoes 90. Thus, the arm 144 is raised and locked in its uppermost position, thereby increasing the height of the exposed portion of front pusher walls 94 to their maximum distance. In FIG. 3 injector shoes 90 are in their retracted ready position with ram 136 also being in its retracted position. At the proper instant which is signaled through a suitable sensing device (not shown) downstream from feed station 2, cylinder 138 is actuated causing injector shoes 90 to move forward in the downstream direction. As the injector shoes move forward there is sufficient force to overcome the static friction between the top surface of the uppermost panel to be moved and the bottom surface of the lowermost remaining panel. At a point prior to the injector shoes 90 reaching their fully extended positions the powered roll 34 will be actuated to continue the downstream movement of the plurality of now moving panels. After the plurality of moving panels moves a short distance downstream, the weight of the remaining stack will exert a vertical force downwardly on the injector shoes 90 and cause them to pivot downwardly about the pinned attaching means 98. This action may best be seen by referring to FIG. 4.

The cylinder 138, having been extended full stroke, is now withdrawn returning injector shoes 90 to their retracted positions. As best seen in FIG. 5, the injector shoes 90 will remain in their down position until they return to a point past the upstream edge of the remaining stack at which time air cylinder 106 will cause the shoes to pivot upwardly to their predetermined height as set by the adjusting mechanism.

As the four stacked panels leave feed station 2, they are conveyed downstream into aligning station 6 where their one longitudinal edge will be aligned as previously described. From aligning station 6 they are conveyed into and through work station 8 as previously described.

While a detailed example of the present invention has been described, it is understood that many changes and modifications may be made in the feed and alignment system without departing from the spirit of the invention. All such modifications are intended to be included within the scope of the appended claims.

What is claimed is:

1. A feed and alignment system of the type adapted to feed a plurality of substantially flat panels from a feed station in a longitudinal direction for passage through a downstream edge aligning mechanism, comprising:
    support means for holding a stack of panels at the feed station,
    an injector mechanism adapted to engage and motivate a predetermined number of panels from the bottom of the stack in the longitudinal direction and including:
        at least one vertically adjustable injector shoe positioned adjacent the bottom upstream edge of the panel stack and having a retracted position that is upstream from the lateral edge of the stack and an extended position that is a predetermined distance downstream from the edge of the stack, and
        means to actuate the injector shoe whereby the shoe will engage the predetermined number of panels at their upstream lateral edges causing them to move in the longitudinal direction toward the downstream edge aligning mechanism,
    conveying means to engage and convey the predetermined number of injected panels as they are traveling in the longitudinal direction whereby the panels are conveyed from the feed station into the downstream aligning station, and
    edge aligning means adapted to cause at least one longitudinal edge of each of the predetermined number of panels to become positioned substantially adjacent to a fixed reference plane.

2. The feed and alignment system as in claim 1 in which the support means includes a plurality of longitudinally spaced, laterally extending rolls, the most downstream of which is sequentially powered.

3. The feed and alignment system as in claim 2 in which the sequentially powered roll has a surface comprised of a material with a relatively high coefficient of friction.

4. The feed and alignment system as in claim 1 in which the injector shoe has means associated therewith that allow the shoe to pivot downwardly when the weight of the stack engages the top of the injector and to return to its ready position when the weight is removed.

5. The feed and alignment system as in claim 1 in which the injector shoe has means associated therewith to vary the vertical height of that portion which engages the upstream edges of the panels, thereby allowing a predetermined number of panels to be fed.

6. The feed and alignment system as in claim 1 in which the conveying means is comprised of a plurality of longitudinally spaced powered rolls positioned downstream from the feed station.

7. The feed and alignment system as in claim 1 in which the edge aligning means is comprised of a longitudinally extending traveling straight edge positioned along one edge of the conveying means and a laterally spaced pivotal crowding edge adapted to engage one common edge of the traveling panels and motivate the opposite edges toward the traveling straight edge.

* * * * *

UNITED STATES PATENT OFFICE
CERTIFICATE OF CORRECTION

PATENT NO. : 3,989,146
DATED : November 2, 1976
INVENTOR(S) : WILSON J. LEE, et al.

It is certified that error appears in the above-identified patent and that said Letters Patent are hereby corrected as shown below:

In column 1, line 18, "approximately" should read --appropriately--;

in column 2, line 9, "stack" should read --stacked--; and in column 4, line 10, "that" should read --the--.

Signed and Sealed this

Twenty-second Day of February 1977

[SEAL]

Attest:

RUTH C. MASON
Attesting Officer

C. MARSHALL DANN
Commissioner of Patents and Trademarks